Nov. 15, 1966   E. KOMENDA   3,285,653
SELF-SUPPORTING VEHICLE BODY
Filed July 6, 1964   3 Sheets-Sheet 1
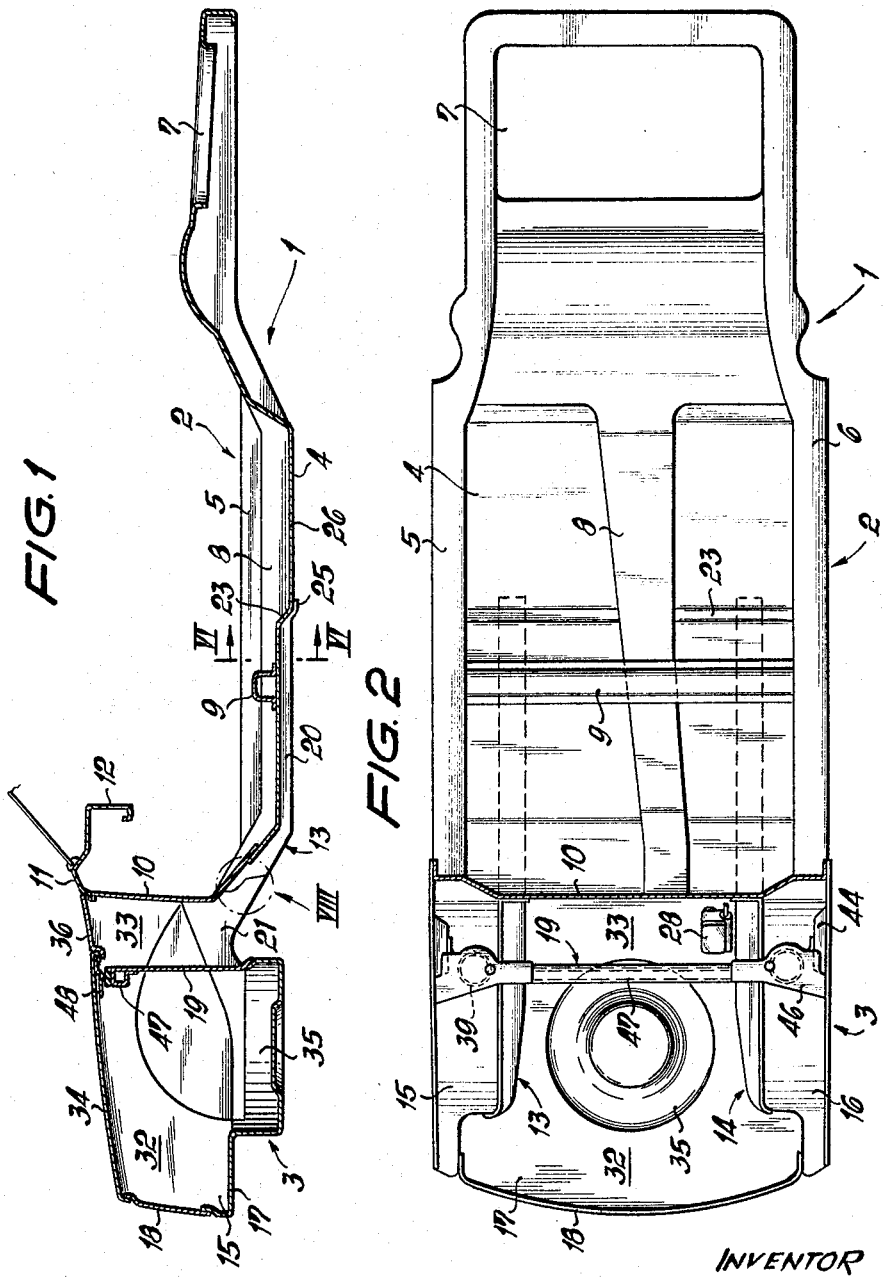
INVENTOR
Erwin KOMENDA
BY Dicke + Craig
ATTORNEYS Nov. 15, 1966   E. KOMENDA   3,285,653
SELF-SUPPORTING VEHICLE BODY
Filed July 6, 1964   3 Sheets-Sheet 2
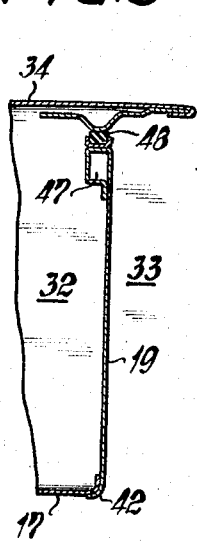
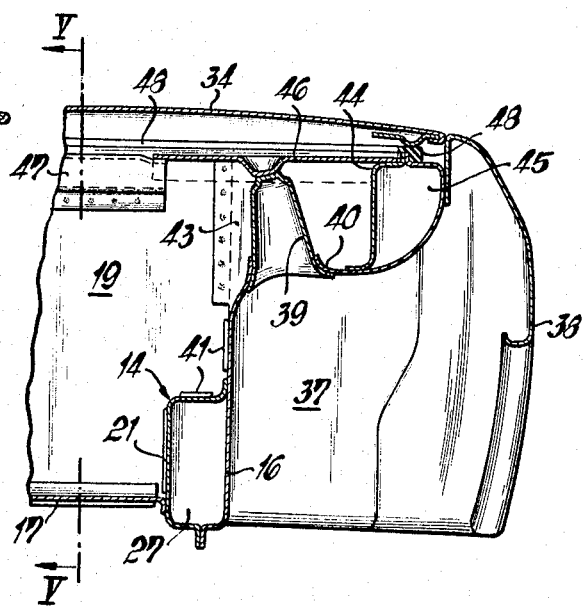
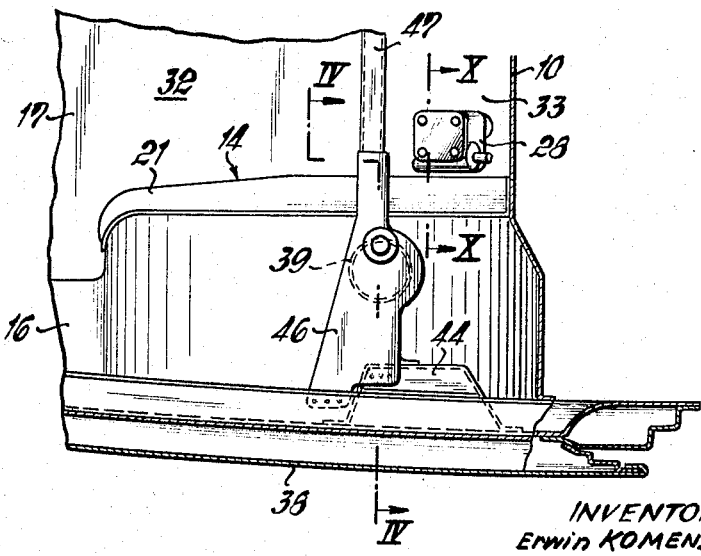
INVENTOR
Erwin KOMENDA
BY Dicker + Craig
ATTORNEYS

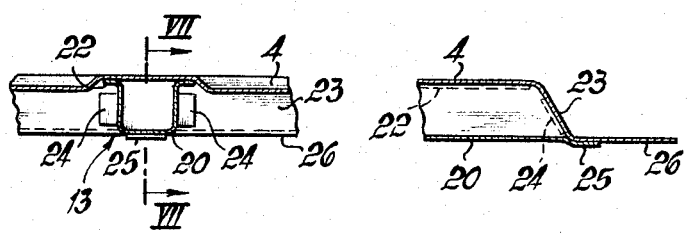
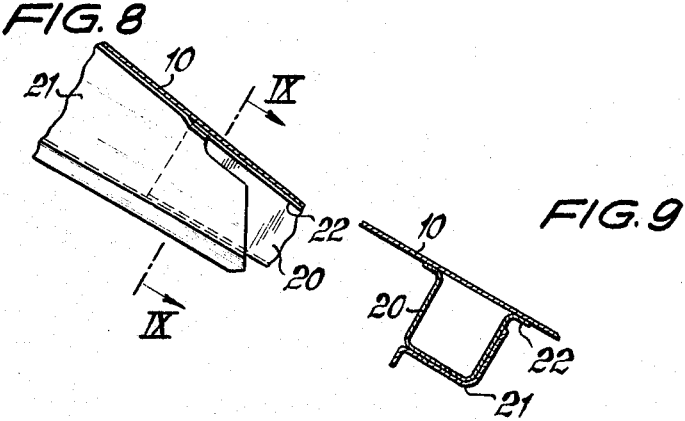
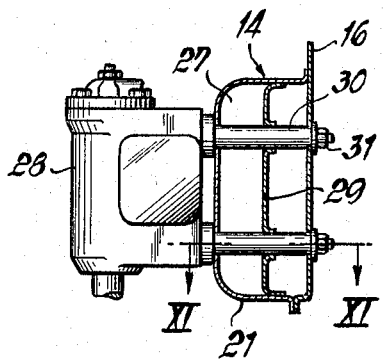
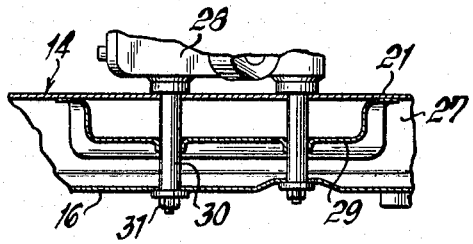

United States Patent Office 3,285,653
Patented Nov. 15, 1966

3,285,653
SELF-SUPPORTING VEHICLE BODY
Erwin Komenda, Stuttgart, Germany, assignor to Firma Dr. Ing. h.c. F. Porsche KG., Stuttgart-Zuffenhausen, Germany
Filed July 6, 1964, Ser. No. 380,500
Claims priority, application Germany, July 18, 1963, P 32.221
9 Claims. (Cl. 296—28)

The present invention relates to a self-supporting vehicle body for motor vehicles, especially passenger motor vehicles, with an end unit constructed as assembly which is secured at the sheet metal floorboard as well as at a front-end closure wall of a center or main section of the vehicle body, and for that purpose is provided with longitudinal bearers extending below the center section as well as diagonal members or struts extending between the longitudinal bearers and the closure or terminal wall.

With the known construction in vehicle bodies of the type described above, the closure or terminal wall of the center or main section as well as also the lateral walls of the end unit are provided with pressed-out or stamped-out portions completed into box-shaped profile or sectional members by additional stampings. Therebeyond cross bearers and local reinforcements are necessary in the prior art constructions within the securing area of the axle units as well as of other accessory parts of the motor vehicle for purposes of reinforcing the vehicle body. These measures and means require an altogether not insignificant time and material expenditure in the manufacture of the vehicle body.

The purpose and aim of the present invention is to avoid the aforementioned disadvantages of the known constructions and to obtain a simple and relatively inexpensive construction of the end parts.

This is achieved in accordance with the present invention in that the diagonal member or strut and the longitudinal bearer of a respective vehicle side are combined within the area of the dashboard into a single hollow box-shaped bearer. As a result thereof, there is produced within the area of the front-end closure or terminal wall of the center or main section of the vehicle body, a hollow box-like member which lies in the extension of the longitudinal bearers projecting below the center section. The end unit is thereby provided over the entire length of its connection with the center section with a hollow box-like structure whereby a relatively long and broad-surfaced connection is obtained. The longitudinal bearer extending below the center section and the box-like bearer of the end unit are completed into closed bodies upon the connection thereof with the center section by wall portions of the latter. A simplification of the construction as well as an advantageous reinforcement of the connecting place is achieved thereby. The sheet metal floorboard of the vehicle body is offset in a step-shaped manner in the longitudinal direction of the vehicle outside of the securing area of the longitudinal bearers of the end unit. Each of the longitudinal bearers is thereby constructed of U-shape, open in the direction toward the sheet metal floorboard, and the longitudinal rims and the end face of the longitudinal bearer are provided with flanges which are connected with the sheet metal floorboard, the stepped portion thereof and the offset part of the sheet metal floorboard. As a result of the connection of the longitudinal bearer, not only with the horizontally extending part of the sheet metal floorboard, but also therebeyond with the stepped portion of the sheet metal floorboard, there is achieved a reinforcement of the vehicle floor. Cross bearers are obviated thereby, which are present in the known construction in large number and by means of which either the passenger space floor or the underside of the sheet metal floorboard are split up and interrupted numerous times. The offset of the sheet metal floorboard corresponds to the height of the longitudinal bearers so that a plane floor termination is achieved thereby.

A further feature of the present invention essentially consists in that the box-like bearers of the end unit are connected by means of a substantially vertical cross wall, arranged at a distance from the closure wall of the center section, whereby a luggage space and a section for the accommodation of auxiliary units and apparatus is created. The cross wall extends over the width and height of the end unit of the vehicle body, is connected by means of flanges with the longitudinal bearers as well as the lateral walls of the end unit and serves for the support of cup-shaped structural parts for a coil spring and/or a shock absorber of the spring system of the motor vehicle. This construction and the arrangement of the wall parts results in a space saving reinforcement of the end unit and simultaneously therewith of the center or main section of the vehicle body. The closure wall of the vehicle center section and the cross wall extending at a distance therefrom produce altogether the effect of a hollow box-like member without, in fact, such box-like member imparing the accommodation of vehicle accessories or the like. The structural parts, especially the portions and sections of the vehicle body loaded or stressed by the spring system of the axle are thereby mutually braced and supported against one another. Each cup-like part is partly surrounded by the cross wall. The cross wall forms within the area of a cup-like part, a T or transfer joint, together with an essentially horizontally extending supporting plate and the lateral wall of the end unit. The cross wall forms further at the height of the support plate a bearer which is connected with the support plate. A floor plate is provided within the luggage space of the end unit which extends exclusively over the section of the vehicle body end unit serving as luggage space, is connected with the longitudinal bearers as well as the cross wall, extends beyond the ends of the longitudinal bearers and is connected in this forward area at a vehicle end wall. The floor plate is provided with trough-shaped indentations or recesses for the accommodations of the spare wheel.

Accordingly, it is an object of the present invention to provide a self-supporting type vehicle body which obviates by extremely simple and relatively inexpensive means the shortcomings encountered with the prior art constructions.

It is another object of the present invention to provide a self-supporting type vehicle body, especially for passenger motor vehicles, in which the various parts may be manufactured in a relatively simple manner so as to provide a reliable reinforcement of all parts of the body subject to loads and stresses without the need for separate costly reinforcing parts.

A further object of the present invention resides in the provision of a self-supporting type body construction in which the various parts are so arranged and constructed and combined with one another as to assure substantial rigidity without the need for numerous reinforcing members, such as diagonal struts or the like.

Still another object of the present invention resides in the provision of a vehicle body of the self-supporting type which produces local reinforcements of the vehicle body wherever necessary, yet reduces the time and material expenditures for the manufacture and assembly of the body.

Another object of the present invention resides in the provision of a vehicle body of the self-supporting type including an end unit and a center section in which the closure wall normally present between the end unit and the center section is utilized to form part of a box-like bearer structure.

Still a further object of the present invention resides in the provision of a self-supporting type body construction in which particularly strong assemblies between the various parts are made possible together with an advantageous reinforcement of the connecting places.

Another object of the present invention resides in the provision of a reinforced floor assembly for a self-supporting type body, especially of a passenger motor vehicle, which obviates the need for cross bearers, and which at the same time permits an expeditious layout and appropriate design of the floor space of the vehicle without undesirable interruptions, subdivisions and/or compartmentation.

A further object of the present invention resides in the provision of a self-supporting type body for motor vehicles in which the luggage compartment is appropriately separated from a space adapted to accommodate auxiliary units and accessories in such a manner as to produce simultaneously a space-saving reinforcement of the end unit as well as of the center section of the body.

These and other objects, features and advantages of the present invention will become more obvious from the following description, when taken in connection with the accompanying drawing which shows, for purposes of illustration only, one embodiment in accordance with the present invention, and wherein FIGURE 1 is a simplified longitudinal center cross sectional view through the floor assembly of the body of a motor vehicle, in part with adjoining structural parts, FIGURE 2 is a top plan view on the floor assembly of FIGURE 1, FIGURE 3 is a partial plan view, partly in cross section and illustrating on an enlarged scale certain parts of the floor assembly of FIGURE 2, FIGURE 4 is a partial cross sectional view taken along the line IV—IV of FIGURE 3, FIGURE 5 is a partial cross sectional view taken along line V—V of FIGURE 4, FIGURE 6 is a partial cross sectional view, on an enlarged scale, taken along VI—VI of FIGURE 1, FIGURE 7 is a partial cross sectional view taken along line VII—VII of FIGURE 6, FIGURE 8 is a partial cross sectional view, on an enlarged scale, illustrating in detail the parts within the dash and dot circle generally designated by reference numeral VIII in FIGURE 1, FIGURE 9 is a partial cross sectional view taken along line IX—IX of FIGURE 8, FIGURE 10 is a partial cross sectional view, on an enlarged scale, taken along line X—X of FIGURE 3, and FIGURE 11 is a partial cross sectional view taken along line XI—XI of FIGURE 10.

Referring now to the drawing wherein like reference numerals are used throughout the various views to designate like parts, reference numeral 1 generally designates therein the floor assembly which consists of two structural assemblies, and more particularly of a center section generally designated by reference numeral 2 and of an end unit generally designated by reference numeral 3. The center section 2 essentially comprises a sheet metal floorboard 4 extending over the width of the vehicle which is provided at the longitudinal rims thereof with box-shaped bearers 5 and 6. The box-shaped bearers 5 and 6 are formed possibly by the sheet metal floorboard 4 itself together with additional appropriate pressed-out parts or stampings. The sheet metal floorboard 4 is provided within the area of the rear end thereof with a cut-out portion or aperture 7 for the accommodation of an internal combustion engine—not further illustrated in the drawing—for the drive of the motor vehicle. The sheet metal floorboard 4 is further provided with a tunnel 8 and includes a cross bearer 9 which serves, inter alia, for the accommodation of conventional seats (not shown). The floorboard 4 is continued by a pressed-out or stamped-out part 10 which constitutes the vehicle dash board and which extends up to the cowl 11 of the vehicle. The instrument panel 12 is made in one piece with the cowl 11.

The end unit generally designated by reference numeral 3 includes longitudinal bearers generally designated by reference numerals 13 and 14, lateral walls 15 and 16, a floor plate 17, a forward end wall 18 and a cross wall generally designated by reference numeral 19.

The longitudinal bearers 13 and 14 extend below the floorboard 4 and are secured thereat as will be described more fully hereinafter. Within the area of the dash board 10 each of the longitudinal bearers 13 and 14 is enlarged in such a manner that it forms a hollow box-like member which is secured at the dash board 10. The bearer 13 and 14 has thereby, with a generally constant width, a height increasing continuously up to the dash board 10, which achieves a maximum within the area of the dash board 10 in order to subsequently decrease again in height.

Each of the longitudinal bearers 13 and 14 is composed of two sections 20 and 21. Of the two sections 20 and 21 of the longitudinal bearer 13 and of a corresponding subdivision of the longitudinal bearer 14, the section 20 is of U-shaped construction with a channel open in the upward direction (FIGURES 6 and 7). This channel is closed into a box-like bearer upon connection of the end unit 3 with the section 2 of the body by means of sheet metal floorboard 4. The section 20 of the longitudinal bearer 13 is provided for that purpose with lateral, angularly bent flanges 22 which are connected with the floorboard 4 by spot welding. The section 20 extends to a point behind the seat cross bearer 9. A step 23 (FIGURES 6 and 7) is provided in the floorboard 4 within the end area of the bearer section 20; the height of step 23 corresponds essentially to the height of the bearer section 20. The longitudinal bearer 13 is closed at the end face thereof by the step 23 and is connected with this step 23 by means of flanges 24. The longitudinal bearer 13 is secured by means of a further flange 25 at the offset part 26 of the floorboard 4.

The longitudinal bearer sections 20 and 21 are connected with each other within the area of the dash board 10. The bearer section 21 is constructed in this area as a form part or sectional member (FIGURES 8 and 9). Outside of this area, i.e., forwardly thereof in the vehicle, the bearer section 21 forms a lateral channel 27 laterally open toward the outside, as can be seen clearly from FIGURES 10 and 11, in which is illustrated the longitudinal bearer 14. The channel 27 is closed into a box-like bearer by the lateral wall 16. The bearer 14, as also the bearer 13, if so desired, serves additionally for the support of auxiliary aggregates or units of the vehicle such as, among others, of the steering gear housing 28. For that purpose the bearer 14 is provided within the securing area of the steering gear housing 28 with a reinforcement 29 which extends inside of the channel 27 and is secured at the bearer section 14 by means of flanges. Spacer sleeves or bushings 30 for the accommodation of the securing bolts 31 of the steering gear housing 28 and passing through the supporting parts are secured in the bearer section 14, the reinforcement 29 as well as the lateral walls 16.

The cross wall 19 extends between the lateral walls 13 and 14 and is arranged at a distance from the dash board 10 of the center vehicle section 2. As a result thereof, the end unit 3 is subdivided into two spaces 32 and 33 of which the space 32 is limited by the lateral walls 15 and 16, the floor plate 17, the forward end wall 18 as well as the cross wall 19. This space 32 is accessible by a lid or cover 34 and serves as luggage space of the vehicle. The floor plate 17 is provided with a trough-shaped recess 35 which serves for the accommodation of a spare wheel of the motor vehicle.

The space 33 is limited by the lateral walls 15 and 16, the walls 19 and 10 extending in the transverse direction of the vehicle as well as by means of a preferably detachable cowl part of panel 36. This space 33 serves for the accommodation of accessories, not illustrated in the drawing, such as, for example, of the fuel tank and of the battery and of the aforementioned steering gear housing 28. The space 33 is essentially open in the direction toward the road surface whereby a good ventilation of the space 33 is achieved.

The lateral walls 15 and 16, the longitudinal bearers 13 and 14 and possibly the floor plate 17 serve for the accommodation of guide spring parts for the front axle of the motor vehicle (not shown in the drawing). The lateral walls 15 and 16 are provided further with indentations or recesses 37 (FIGURE 4) to form the wheel casings for the steerable wheels; each of the indentations or recesses 37 is covered by means of a removable outer wall or panel 38, (FIGURES 3 and 4). A hat-shaped form part 39 is inserted into the lateral wall 16 within the area of the indentations 37 which form part 39 is connected by means of mutually overlapping flanges 40 of this lateral wall 16 and of the form part 39 with the lateral wall. The form part 39 serves for the securing, for example, of a shock absorber forming part of the wheel suspension (not illustrated).

The cross wall 19 is connected by means of flanges 41 (FIGURE 4) with the lateral wall 16 and with the bearer section 21 of the longitudinal bearer 14. The cross wall 19 is connected with the floor plate 17 by means of mutually overlapping flanges 42 (FIGURE 5) of the wall 19 and of the floor plate 17. The cross wall 19 is extended by means of a wall portion 43 (FIGURE 4) which partly surrounds the pot-shaped part 39 and is rigidly connected therewith. The wall part 43 extends up to a stamping 44, is secured at the lateral wall 16 and is provided exclusively within the securing area of the wall part 43. The stamping 44 forms together with the lateral wall 16 a hollow box-like member 45 whereby the connection of the wall part 43 to the lateral wall 16 is reinforced. A gusset plate or sheet metal member 46 (FIGURES 3 and 4) is secured at the stamping 44 of the lateral wall 16 as well as at the walls 43 and 19; the sheet metal connection member 46 extends substantially horizontally and effects a three dimensional local support of the form-part as well as of the other adjoining walls. A box-shaped cross bearer 47 adjoins the sheet metal connection member 46 within the area of the cross wall 19. The cross bearer 47 is constituted by a corresponding bending over the rim portion of the cross wall 19. Seals 48 are secured at the cross bearer 47 and at the lateral wall 16, on which is supported the cover 34.

While I have shown a described one embodiment in accordance with the present invention, it is understood that the same is not limited thereto but is susceptible to numerous changes and modifications as known to a person skilled in the art and I therefore do not wish to be limited to the details shown and described herein but intend to cover all such changes and modifications as are encompassed by the scope of the appended claims.

I claim:
1. A self-supporting vehicle body for motor vehicles, especially passenger motor vehicles, comprising:
   an end unit formed by a plurality of body parts including longitudinal bearer means and support means extending at an angle to the longitudinal bearer means,
   a vehicle body center section having body wall means including floor means and end-face closure wall means forming a dashboard,
   said longitudinal bearer means extending underneath the center section and said support means extending underneath said closure wall means,
   said longitudinal bearer means and said support means of a respective vehicle side and said center section comprising wall means forming a single hollow bearer structure,
   said floor means being offset in the longitudinal direction of the vehicle in a step-like manner at the end of the longitudinal bearer means of the end unit,
   each of said longitudinal bearer means having longitudinal rim portions and an end face, said longitudinal bearer means being of U-shaped construction, open in the direction toward said floor means, and said longitudinal rim portions as well as said end face being provided with flanges which are connected with the floor means, with the stepped portion thereof and with the offset portion of the floor means,
   the stepped portion of the floor means corresponding to the height of the longitudinal bearer means.
2. A self-supporting vehicle body for motor vehicles, especially passenger motor vehicles having a vehicle spring system, comprising:
   an end unit formed by a plurality of body parts including longitudinal bearer means and support means extending at an angle to the longitudinal bearer means,
   a vehicle body center section having body wall means including floor means and end-face closure wall means forming a dashboard,
   said longitudinal bearer means extending underneath the center section and said support means extending underneath said closure wall means,
   said longitudinal bearer means and said support means of a respective vehicle side and said center section comprising wall means forming a single hollow bearer structure,
   and an approximately vertical cross wall arranged at a distance from said closure wall means and interconnecting the box-like bearer structures of the end unit to form a luggage spree and a section for the accommodation of auxiliary units,
   said end unit including lateral wall means, said cross wall extending substantially over the width and height of the end unit of the vehicle body and including flange means for connecting the cross wall with the longitudinal bearer means as well as with said lateral wall means, said cross wall serving for the support of parts of the vehicle spring system,
   and cup-like structural parts for supporting parts of the vehicle spring system, said cup-like structural parts being supported by and being at least partly surrounded by said cross wall.
3. A self-supporting vehicle body for motor vehicles, especially passenger motor vehicles having a vehicle spring system, comprising:
   an end unit formed by a plurality of body parts including longitudinal bearer means and support means extending at an angle to the longitudinal bearer means,
   a vehicle body center section having body wall means including floor means and end-face closure wall means forming a dashboard,
   said longitudinal bearer means extending underneath the center section and said support means extending underneath said closure wall means,
   said longitudinal bearer means and said support means of a respective vehicle side and said center section comprising wall means forming a single hollow bearer structure,
   and an approximately vertical cross wall arranged at a distance from said closure wall means and interconnecting the box-like bearer structures of the end unit to form a luggage space and a section for the accommodation of auxiliary units,
   said end unit including lateral wall means and support plate means extending approximately horizontally, said cross wall extending substantially over the width and height of the end unit of the vehicle body and including flange means for connecting the cross wall with the longitudinal bearer means as well as with said lateral wall means, said cross wall serving for the support of parts of the vehicle spring system,
   and cup-like structural parts for supporting parts of the vehicle spring system, said cup-like structural parts being supported by and being at least partly
surrounded by said cross wall,
said cross wall forming a transfer joint within the area
of the cup-like structural parts and of the lateral
wall means of the end unit as well as with said support plate means.

4. A self-supporting vehicle body for motor vehicles,
especially passenger motor vehicles having a vehicle
spring system, comprising:
an end unit formed by a plurality of body parts including longitudinal bearer means and support means
extending at an angle to the longitudinal bearer
means,
a vehicle body center section having body wall means
including floor means and end-face closure wall
means forming a dashboard,
said longitudinal bearer means extending underneath
the center section and said support means extending
underneath said closure wall means,
said longitudinal bearer means and said support means
of a respective vehicle side and said center section
comprising wall means forming a single hollow bearer
structure,
and an approximately vertical cross wall arranged at
a distance from said closure wall means and interconnecting the box-like bearer structures of the end
unit to form a luggage space and a section for the
accommodation of auxiliary units,
said end unit including lateral wall means and support
plate means extending approximately horizontally,
said cross wall extending substantially over the
width and height of the end unit of the vehicle body
and including flange means for connecting the cross
wall with the longitudinal bearer means as well as
with said lateral wall means, said cross wall serving
for the support of parts of the vehicle spring system,
and cup-like structural parts for supporting parts of
the vehicle spring system, said cup-like structural
parts being supported by and being at least partly
surrounded by said cross wall,
said cross wall forming a transfer joint within the area
of the cup-like structural parts and of the lateral
wall means of the end unit as well as with said support plate means,
and said cross wall adjoining a bearer at the height of
said support plate means which is connected with
said support plate means.

5. A self-supporting vehicle body for motor vehicles,
especially passenger motor vehicles, comprising:
an end unit formed by a plurality of body parts including longitudinal bearer means and support means
extending at an angle to said longitudinal bearer
means,
a vehicle body center section having body wall means
including floor means and end-face closure wall
means forming a dashboard,
said longitudinal bearer means extending underneath
the center section and said support means extending
underneath said closure wall means,
said longitudinal bearer means and said support means
of a respective vehicle side and said center section
comprising wall means forming a single hollow bearer
structure,
an approximately vertical cross wall arranged at a
distance from said closure wall means and interconnecting the box-like bearer structures of the end
unit to form a luggage space and a section for the
accommodation of auxiliary units,
and a floor plate extending exclusively over the section
of the vehicle body end unit serving as luggage space,
said floor plate being connected with said longitudinal bearer means and with said cross wall, extending
beyond the forward ends of said longitudinal bearer
means and being connected in the forward area at
at a vehicle end wall forming part of the end unit.

6. A self-supporting vehicle body for motor vehicles,
especially passenger motor vehicles, comprising:
an end unit formed by a plurality of body parts including longitudinal bearer means and support means
extending at an angle to said longitudinal bearer
means,
a vehicle body center section having body wall means
including floor means and end-face closure wall
means forming a dashboard,
said longitudinal bearer means extending underneath
the center section and said support means extending
underneath said closure wall means,
said longitudinal bearer means and said support means
of a respective vehicle side and said center section
comprising wall means forming a single hollow bearer
structure,
an approximately vertical cross wall arranged at a
distance from said closure wall means and interconnecting the box-like bearer structures of the end
unit to form a luggage space and a section for the
accommodation of auxiliary units,
and a floor plate extending exclusively over the section
of the vehicle body end unit serving as luggage space,
said floor plate being connected with said longitudinal bearer means and with said cross wall, extending
beyond the forward ends of said longitudinal bearer
means and being connected in the forward area at
at a vehicle end wall forming part of the end unit,
said floor plate being provided with a trough-shaped
indentation for the accommodation of a spare wheel.

7. A self-supporting vehicle body for motor vehicles,
especially passenger motor vehicles, comprising:
an end unit formed by a plurality of body parts including longitudinal bearer means and support means
extending at an angle to said longitudinal bearer
means,
a vehicle body center section having body wall means
including floor means and end-face closure wall
means forming a dashboard,
said longitudinal bearer means extending underneath
the center section and said support means extending
underneath said closure wall means,
said longitudinal bearer means and said support means
of a respective vehicle side and said center section
comprising wall means forming a single hollow bearer
structure,
an approximately vertical cross wall arranged at a
distance from said closure wall means and interconnecting the box-like bearer structures of the end
unit to form a luggage space and a section for the
accommodation of auxiliary units,
said end unit further including lateral wall means and
supporting plate means, said cross wall extending
substantially over the width of the end unit and including flange means for connecting the cross wall
with the longitudinal bearer means as well as with
said lateral wall means, said cross wall forming a
T-joint within the area of said lateral wall means.

8. A self-supporting vehicle body for motor vehicles,
especially passenger motor vehicles, comprising:
an end unit formed by a plurality of body parts including longitudinal bearer means and support means
extending at an angle to said longitudinal bearer
means,
a vehicle body center section having body wall means
including floor means and end-face closure wall
means forming a dashboard,
said longitudinal bearer means extending underneath
the center section and said support means extending
underneath said closure wall means,
said longitudinal bearer means and said support means
of a respective vehicle side and said center section
comprising wall means forming a single hollow bearer
structure, an approximately vertical cross wall arranged at a distance from said closure wall means and interconnecting the box-like bearer structures of the end unit to form a luggage space and a section for the accommodation of auxiliary units, said end unit further including lateral wall means and supporting plate means, said cross wall extending substantially over the width of the end unit and including flange means for connecting the cross wall with the longitudinal bearer means as well as with said lateral wall means, said cross wall forming a T-joint within the area of said lateral wall means, and a floor plate extending exclusively over the section of the vehicle body end unit serving as luggage space, said floor plate being connected with said longitudinal bearer means and with said cross wall, extending beyond the forward ends of said longitudinal bearer means and being connected in the forward area at a vehicle end wall forming part of the end unit, said floor plate being provided with a trough-shaped indentation for the accommodation of a spare wheel.

9. A self-supporting vehicle body for motor vehicles, especially passenger motor vehicles, comprising:

an end unit formed by a plurality of body parts including longitudinal bearer means and support means extending at an angle to the longitudinal bearer means, a vehicle body center section having body wall means including floor means and end-face closure wall means forming a dashboard, said longitudinal bearer means extending underneath the center section and said support means extending underneath said closure wall means, said longitudinal bearer means and said support means of a respective vehicle side and said center section comprising wall means forming a single hollow bearer structure, said wall means completing the longitudinal bearer means extending under the center section and the box-like bearer structure of the end unit into closed bodies upon connection thereof with the center section, said floor means being offset in the longitudinal direction of the vehicle in a step-like manner at the end of the longitudinal bearer means of the end unit, each of said longitudinal bearer means having longitudinal rim portions and an end face, said longitudinal bearer means being of U-shaped construction, open in the direction toward said floor means, and said longitudinal rim portions as well as said end face being provided with flanges which are connected with the floor means with the stepped portions thereof and with the offset portion of the floor means, the step-like portion of the floor means corresponding to the height of the longitudinal bearer means, an approximately vertical cross wall arranged at a distance from said closure wall means and interconnecting the box-like bearer structures of the end unit to form a luggage space and a section for the accommodation of auxiliary units, said end unit including lateral wall means, said cross wall extending substantially over the width and height of the end unit of the vehicle body and including flange means for connecting the cross wall with the longitudinal bearer means as well as with said lateral wall means, and further structural parts for supporting parts of the vehicle spring system, said further structural parts being supported by said cross wall, support plate means in the end unit extending generally horizontally, said cross wall forming a transfer joint within the area of the further structural parts and of the lateral wall means of the end unit as well as with the support plate means, said cross wall also adjoining a bearer at the height of said support plate means which is connected with said support plate means, and a floor plate extending over the section of the vehicle body end unit serving as luggage space, said floor plate being connected with said longitudinal bearer means and with said cross wall, extending beyond the forward ends of said longitudinal bearer means and being connected in the forward area at at a vehicle end wall forming part of the end unit.

References Cited by the Examiner
UNITED STATES PATENTS

| | | | |
|---|---|---|---|
| 2,202,859 | 6/1940 | Ledwinka | 296—28 |
| 3,014,730 | 12/1961 | Cole | 296—28 X |
| 3,054,636 | 9/1962 | Wessells | 296—28 |
| 3,202,451 | 8/1965 | Auger et al. | 296—28 |

BENJAMIN HERSH, *Primary Examiner.*

J. A. PEKAR, *Assistant Examiner.*